United States Patent
Korb et al.

(10) Patent No.: US 6,167,792 B1
(45) Date of Patent: Jan. 2, 2001

(54) TOOTH FORM FOR A SAW BLADE

(75) Inventors: William B. Korb, Melrose, CT (US); John Milton-Benoit, Springfield, MA (US); Stephen Hampton, East Longmeadow, MA (US); James Holston, Orange, MA (US)

(73) Assignee: American Saw & Mfg. Company, East Longmeadow, MA (US)

(*) Notice: Under 35 U.S.C. 154(b), the term of this patent shall be extended for 0 days.

(21) Appl. No.: 09/015,122

(22) Filed: Jan. 29, 1998

Related U.S. Application Data

(63) Continuation-in-part of application No. 08/967,279, filed on Nov. 7, 1997, now Pat. No. 6,003,422, which is a continuation of application No. 08/577,930, filed on Dec. 22, 1995, now abandoned, which is a continuation-in-part of application No. 08/408,847, filed on Mar. 23, 1995, now abandoned.

(51) Int. Cl.[7] .............................. B27B 33/02; B23D 61/00
(52) U.S. Cl. .................................. 83/835; 83/855
(58) Field of Search ........................... 83/661, 663, 835, 83/854, 855; 76/112, 115

(56) References Cited

U.S. PATENT DOCUMENTS

| | | | |
|---|---|---|---|
| 142,781 | * | 9/1873 | Emerson .............................. 83/855 |
| 167,882 | * | 9/1875 | Emerson .............................. 76/112 |
| 2,757,697 | * | 8/1956 | Simmons et al. ..................... 83/661 |
| 3,072,164 | * | 1/1963 | Ramirez et al. ..................... 83/661 |
| 3,651,841 | * | 3/1972 | Ohlsson ............................ 83/835 X |
| 4,012,820 | * | 3/1977 | Nowak .............................. 83/835 X |
| 4,179,967 | * | 12/1979 | Clark .............................. 83/661 |
| 4,232,578 | * | 11/1980 | Stellinger et al. .................. 83/661 |
| 4,292,871 | | 10/1981 | Neumeyer et al. .................... 83/661 |
| 4,587,876 | * | 5/1986 | Erhardt ............................ 83/855 X |
| 4,640,172 | * | 2/1987 | Kullmann et al. .................... 83/835 X |
| 5,018,421 | | 5/1991 | Lucki et al. ....................... 83/835 |
| 5,249,485 | | 10/1993 | Hayden, Sr. ........................ 76/112 |
| 5,331,876 | * | 7/1994 | Hayden, Sr. ........................ 83/661 |
| 5,501,129 | | 3/1996 | Armstrong et al. ................... 83/848 |
| 5,761,981 | * | 6/1998 | Stoffels ........................... 83/835 X |

FOREIGN PATENT DOCUMENTS 64-11708   1/1989   (JP) .

* cited by examiner

*Primary Examiner*—Clark F. Dexter
(74) *Attorney, Agent, or Firm*—Cummings & Lockwood

(57) ABSTRACT

In a saw blade having a cutting edge defined by a plurality of teeth disposed along the blade, each tooth includes a tip, a rake face, and a curvilinear base surface. The tip of each tooth and the tip of the next consecutively disposed tooth cooperate to define a pitch distance therebetween, with the curvilinear base surface and the tip of each tooth cooperating to define a maximum gullet depth. In addition, the rake face and the curvilinear base surface of each tooth define an effective gullet radius greater than about 25% of the pitch distance, and also greater than about 55% of the maximum gullet depth.

17 Claims, 2 Drawing Sheets

TOOTH FORM FOR A SAW BLADE

CROSS REFERENCE TO RELATED APPLICATIONS

This patent application is a continuation-in-part of U.S. patent application Ser. No. 08/967,279 entitled "SYNCHRONIZED VARIABLE TOOTH ARRANGEMENTS FOR SAWS", filed on Nov. 7, 1997, now U.S. Pat. No. 6,003,422, which is a continuation of Ser. No. 08/577,930, also entitled "SYNCHRONIZED VARIABLE TOOTH ARRANGEMENTS FOR SAWS", filed on Dec. 22, 1995, now abandoned, which in turn is a continuation-in-part of Ser. No. 08/408,847 filed on Mar. 23, 1995, now abandoned.

FIELD OF THE INVENTION

The present invention relates generally to saw blades, and deals more particularly with an improved tooth form for providing enhanced discharge of chips from the gullet area of each tooth and improved tooth strength.

BACKGROUND OF THE INVENTION

The terms used herein to describe the profile of a saw blade tooth are to be construed in accordance with the definitions found in International Standard Number ISO 4875/1-1978. In addition, the phrase "effective gullet radius" as used herein should be construed to mean the horizontal distance from the leftmost point of the gullet area, when the saw blade is viewed with the teeth pointing upward, to the point where the gullet depth reaches its maximum value.

In many instances, particularly in production settings, it is desirable to cut materials such as wood, plastic, and metal at the highest feed rates achievable. However, the rate at which a particular material can be presented to the saw blade is governed in large part by the stresses induced in the teeth of the blade, as well as by the rate at which particles or chips generated by the cutting action of the blade are discharged from the gullet area between consecutively spaced teeth.

In prior art tooth forms, the effective gullet radius is relatively small, typically less than approximately 25% of the tooth pitch. In addition, the gullet depth is typically between about 40% and about 50% of the tooth pitch with the length of the rake face accounting for approximately half of the height. As a result of this relatively small effective gullet radius and the relatively long rake face, shear stresses are concentrated at the base of each tooth on the saw blade which often are of sufficient magnitude to tear or shear a tooth from the saw blade during a cutting operation.

Another problem associated with known tooth forms having a profile similar to that described above is that during a cutting operation the long rake face combined with a small gullet radius inhibits the flow of chips out of the gullet area by acting as a barrier. This creates the potential for the chips generated during a cutting operation to become lodged in the gullet area, which in turn diminishes the cutting efficiency of the saw blade. To minimize this problem, the feed rate of the material through the saw, or the cutting speed of the blade, must be reduced resulting in a concomitant reduction in production.

Based on the foregoing, it is the general object of the present invention to provide a saw blade employing a tooth profile that overcomes the above-described drawbacks of prior art saw blade teeth.

It is a more specific object of the present invention to provide a saw tooth profile having enhanced chip discharge characteristics.

SUMMARY OF THE INVENTION

The present invention is directed to a saw blade having a cutting edge defined by a plurality of teeth disposed along the blade. Each of the teeth includes a tip, a rake face, a relief surface, and a curvilinear base surface, with the tip of one tooth and the tip of the next consecutive tooth defining a pitch distance therebetween. The tip of each tooth and the curvilinear base surface disposed between consecutively spaced teeth cooperate to define a maximum gullet depth. In addition, the rake face of each tooth and the curvilinear base surface cooperate to define the effective gullet radius.

To provide enhanced chip discharge capabilities over prior art saw blades, the saw tooth profile of the present invention includes an effective gullet radius that is greater than approximately 25% of the pitch distance, and 55% of the maximum gullet depth. This larger radius extends upwardly toward the tip of the tooth leaving only a small vertical rake face, thereby minimizing any barriers that would inhibit the flow of chips from between the teeth of the blade. To further improve the chip discharge characteristics, the tooth profile can also be formed such that the relationship between the pitch distance and the height of the tooth is optimized. Preferably, the gullet depth of the saw blade of the present invention is greater than approximately 40% of the pitch distance.

In addition to the foregoing, each saw tooth may include a primary relief surface defined by a first relief angle extending from the tip of the tooth in a direction opposite to the cutting direction of the saw blade, and a secondary relief surface extending from the first relief surface and defined by a second relief angle different from, and larger than the first relief angle. Preferably, the first relief angle is approximately 35° and the second relief angle is between about 45° and about 55°, with both the first and second relief angles being measured from a plane approximately perpendicular to the cutting direction of the blade. The presence of the secondary relief surface, coupled with the fact that the second relief angle is larger than the first relief angle, increases the gullet area between consecutive teeth over that which would be achieved if only the first relief angle were present. This increased gullet area reduces the likelihood of chips lodging between consecutively disposed teeth by providing a larger gullet area for chips to collect. The increased gullet area also allows the rate of chip ingress to, and egress from the gullet area to equilibrate during a cutting operation.

In addition to providing enhanced chip discharge capabilities over that of known saw blades, it is also desirable to maximize the stress bearing capabilities of the saw teeth. Accordingly, the teeth of the saw blade of the present invention employ a relatively short rake face, preferably less than 25% of the gullet depth, and a large radius tangent to the rake face which is defined by the curvilinear base surface. The combination of the short rake face and large radius increases the stress bearing characteristics of the saw teeth by providing greater tooth width at the base of each tooth where stresses are greatest, without increasing the gullet depth. This reduces the likelihood of the teeth shearing or tearing during a cutting operation.

DETAILED DESCRIPTION OF THE PREFERRED EMBODIMENTS

Figure 1:
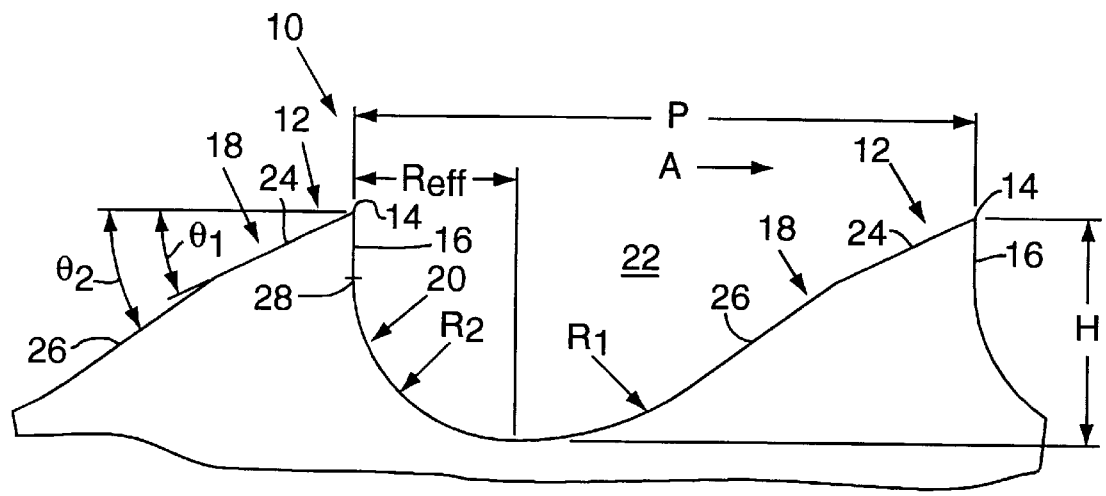
FIG. 1 is an enlarged partial side elevational view of the saw blade of the present invention.

FIG. 1 illustrates a saw blade embodying the invention. The saw blade, generally designated by the reference numeral 10, includes a cutting edge defined by a plurality of saw teeth 12, each tooth having a tip 14, a rake face 16, and a relief surface 18 extending from the tip in a direction opposite to the saw blade's cutting direction designated in FIG. 1 by arrow A. The teeth 12 are spaced along the cutting edge with the tip of one tooth and the tip of the next consecutively disposed tooth cooperating to define a pitch distance P. A curvilinear base surface 20 extends between the rake face 16 of one tooth 12 and the relief surface 18 of the next consecutive tooth. As shown in FIG. 1, the base surface 20 is tangent to the rake face 16. The rake face 16, the curvilinear base surface 20, and the relief surface 18 cooperate to define a gullet area 22. In addition, an effective gullet radius $R_{eff}$ is defined by the rake face 16 and the curvilinear base surface 20. $R_{eff}$ is equal to the horizontal distance from the leftmost point of the gullet area 22, when the saw blade 10 is viewed in the orientation shown in FIG. 1, to the point where the gullet depth H reaches its maximum value.

Still referring to FIG. 1, the relief surface 18 includes a primary relief surface 24 extending from the tip 14 of the tooth 12 and a secondary relief surface 26 extending from the primary relief surface tangent to a radius $R_1$ defined by the curvilinear base surface 20. The primary and secondary relief surfaces, 24 and 26 respectively, are further defined by first and second relief angles, $\theta_1$ and $\theta_2$, respectively, measured from a plane extending parallel to the cutting direction A of the saw blade 10 (or between the tips of consecutively disposed teeth). Preferably, the second relief angle $\theta_2$ is larger than the first relief angle $\theta_1$, thereby increasing the size of the gullet area 22 over that which would be possible if only the first relief surface were present.

In the embodiment of the present invention illustrated in FIG. 1, the effective gullet radius $R_{eff}$ is greater than approximately 25%, and preferably equal to about 30% of the pitch distance P. In addition, the effective gullet radius $R_{eff}$ is greater than approximately 55% of the gullet depth H, and is preferably between about 65% and 85% of the gullet depth, and most preferably equal to about 81% of the gullet depth. Moreover, the length of the rake face 16 between the tip 14 of the tooth 12 and the point 28 where the rake face is tangent to a radius $R_2$ defined by the curvilinear base surface 20, is preferably less than 25% of the gullet depth. This relatively short rake face length allows the radius $R_2$ to be maximized thereby minimizing stress at the base of the tooth.

Still referring to FIG. 1, during a cutting operation, chips generated by the saw blade 10 flow into the gullet areas 22 between consecutively disposed teeth 12. As the cutting operation continues, the chips must be discharged from the gullet areas 22 so that newly generated chips can be accommodated. The large effective gullet radius $R_{eff}$, the relatively short rake face 16, the primary and secondary relief surfaces, 24 and 26 respectively, and the curvilinear base surface 20 all cooperate to define a gullet area 22 that provides for the smooth ingress and egress of chips to and from the gullet area.

Figure 2:
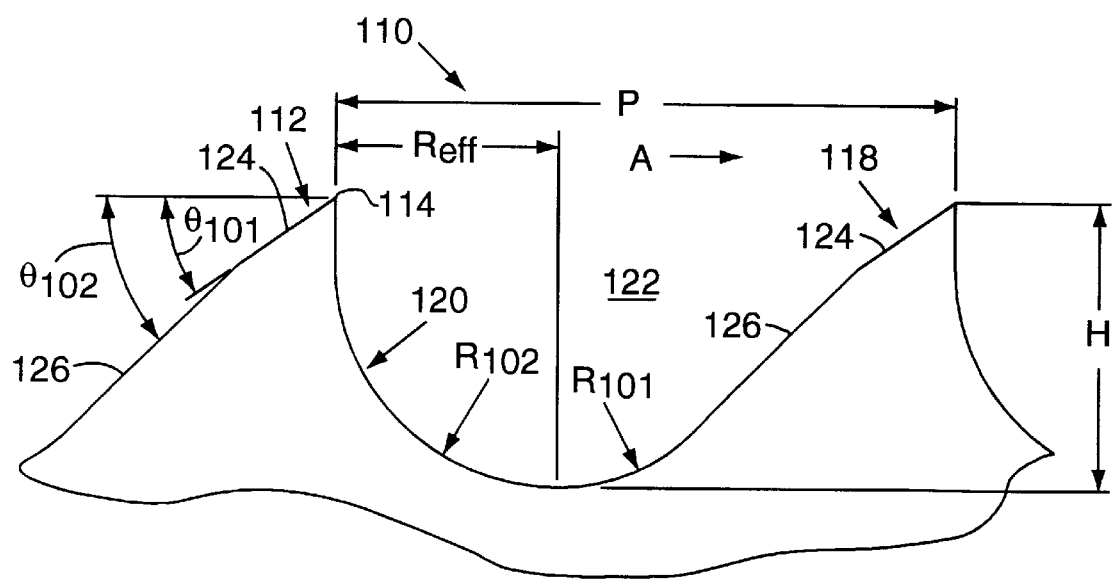
FIG. 2 is an enlarged partial side elevational view of an alternate embodiment of the saw blade of FIG. 1.

A second embodiment of the saw blade of the present invention, shown in FIG. 2, is generally designated by the reference numeral 110. The saw blade 110 is similar in many respects to the saw blade 10 described above, and therefore like reference numerals preceded by the number 1 are used to indicate like elements. The saw blade 110 differs from the saw blade 10 in that the effective gullet radius $R_{eff}$ is approximately 36% of the pitch distance P and approximately 77% of the gullet depth H. In addition, the gullet depth is approximately 46% of the pitch distance P.

Still referring to FIG. 2, the relief surface 118 includes a primary relief surface 124 extending from the tip 114 of the tooth 112, and a secondary relief surface 126 extending from the primary relief surface tangent to the radius $R_{101}$ defined by the curvilinear base surface 120. The primary and secondary relief surfaces, 124 and 126, are further defined by first and second relief angles, $\theta_{101}$ and $\theta_{102}$, respectively, measured from a plane extending parallel to the cutting direction of the saw blade 110. Preferably, the second relief angle $\theta_{102}$ is larger than the first relief angle $\theta_{101}$. In the illustrated embodiment $\theta_{101}$ is approximately 35°, and $\theta_{102}$ is approximately 45°.

Figure 3:
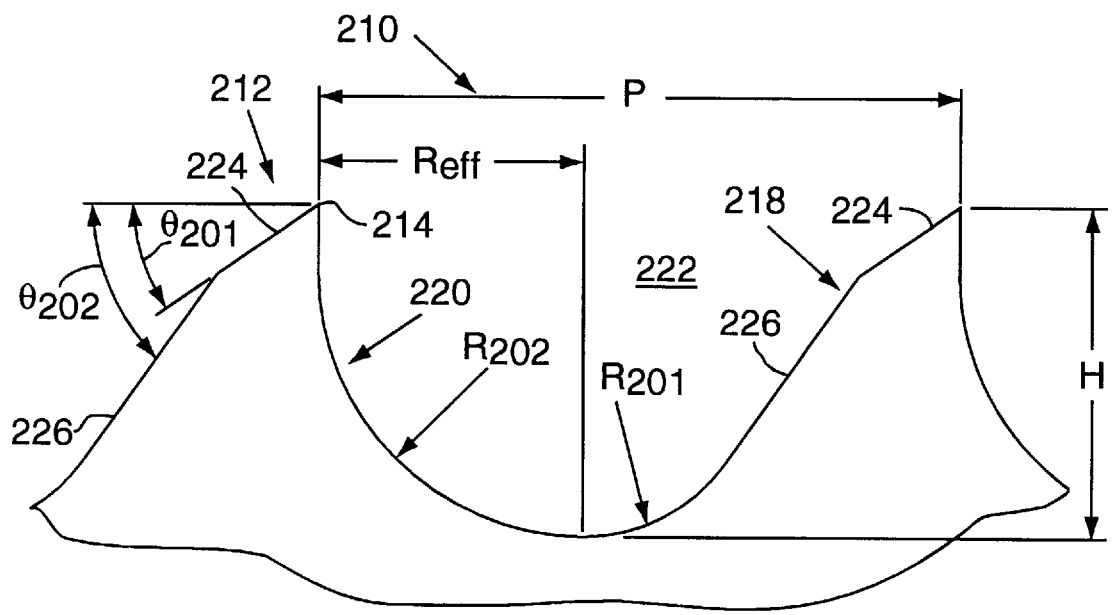
FIG. 3 is an enlarged partial side elevational view of an alternate embodiment of the saw blade of FIG. 1.

A third embodiment of the saw blade of the present invention is shown in FIG. 3 and is generally designated by the reference numeral 210. The saw blade 210 is similar in many respects to the saw blade 10 described above, and therefore like reference numerals preceded by the number 2 are used to indicate like elements. The saw blade 210 differs from the saw blade 10 in that the effective gullet radius $R_{eff}$ is approximately 41% of the pitch distance P and approximately 79% of the gullet depth H. In addition, the gullet depth is approximately 46% of the pitch distance.

The relief surface 218 includes a primary relief surface 224 extending from the tip 214 of the tooth 212, and a secondary relief surface 226 extending from the primary relief surface tangent to the radius $R_{201}$ defined by the curvilinear base surface 220. The primary and secondary relief surfaces, 224 and 226, are further defined by first and second relief angles, $\theta_{201}$ and $\theta_{202}$, respectively, measured from a plane extending parallel to the cutting direction of the saw blade 210. Preferably, the second relief angle $\theta_{202}$ is larger than the first relief angle $\theta_{201}$. In the illustrated embodiment $\theta_{201}$ is approximately 35°, and $\theta_{202}$ is approximately 55°.

Figure 4:
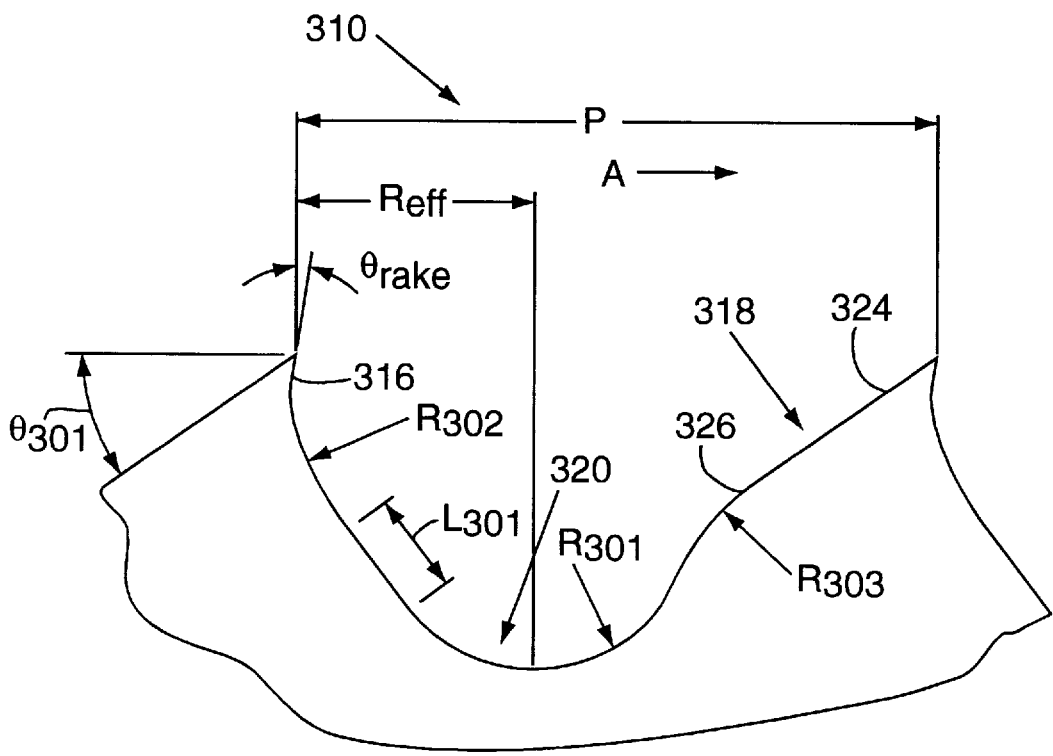
FIG. 4 is an enlarged partial side elevational view of an alternate embodiment of the saw blade of FIG. 1.

A fourth embodiment of the saw blade of the present invention is shown in FIG. 4 and is generally designated by the reference numeral 310. The saw blade 310 is similar in many respects to the saw blade 10 described above, and therefore like reference numerals preceded by the number 3 are used to indicate like elements. The saw blade 310 differs from the saw blade 10 in that the rake face 316 defines a positive rake angle $\theta_{rake}$ measured from a plane extending approximately perpendicular to the cutting direction A of the saw blade 310 (or between the tips of consecutively disposed teeth). While the angle $\theta_{rake}$ is positive in the illustrated embodiment, the present invention is not limited in this regard as $\theta_{rake}$ can also be zero or negative without departing from the broader aspects of the invention.

The embodiment illustrated in FIG. 4 also differs from the other embodiments described above in that the curvilinear base surface 320 is defined by a combination of radii, $R_{301}$ and $R_{302}$, with rectilinear portion $L_{301}$ interposed therebetween. In addition, the relief surface 318 includes a primary relief surface 324 defined by relief angle $\theta_{301}$, and a secondary relief surface 326 defined by radius $R_{303}$. In the illustrated embodiment, the radius $R_{303}$ is tangent to the primary relief surface 324 and the radius $R_{301}$ defined by the curvilinear base surface 320. In addition, the radius $R_{303}$ is convex relative to the radius $R_{301}$ defined by the curvilinear base surface 320. However, the invention is not limited in this regard as the radius $R_{303}$ can be either convex or concave and does not have to be tangent to the primary relief surface 324 or the curvilinear base surface 320. In addition, while the curvilinear base surface 320 has been shown and described as being defined by a combination of radii, $R_{301}$ and $R_{302}$, with rectilinear portion $L_{301}$ interposed therebetween, the present invention is not limited in this regard. The curvilinear base surface 320 can be defined by any combination of radii and rectilinear sections without departing from the broader aspects of the present invention. Moreover, the relief surface 318 while shown and described in the illustrated embodiment as including a rectilinear primary relief surface 324 and a radial secondary relief surface 326, is not limited in this regard as any combination of radial and rectilinear surfaces can be employed without departing from the broader aspects of the present invention.

Referring to FIGS. 2–4, during a cutting operation, chips are generated by the saw blades, 110, 210, or 310 which flow into the respective gullet areas. As the cutting operation continues, the chips must be discharged from the gullet areas so that newly generated chips can be accommodated. The larger effective gullet radii $R_{eff}$, the relatively short rake faces, the larger angles or radii of the secondary relief surfaces 126, 226, and 326, as well as the curvilinear base surfaces 120, 220, or 320 of each of these blades, all cooperate to define gullet areas larger than those of known saw blades. The large gullet areas provide the saw blades with the capability to handle larger volumes of chips, thereby enabling the blades to operate at higher speeds. In addition, the large radii which define the curvilinear base surfaces provide the teeth of these blades with enhanced stress bearing capabilities by minimizing any stress concentrations at the base of the teeth. This in turn reduces the likelihood of the teeth shearing or tearing from the blades, thereby enabling them to cut materials at higher speeds which would normally impose large amounts of stress on the teeth.

While preferred embodiments have been shown and described, various modifications and substitutions may be made without departing from the spirit and scope of the present invention. Accordingly, it is to be understood that the present invention has been described by way of example, and not by limitation.

What is claimed is:

1. A saw blade having a cutting edge defined by a plurality of teeth disposed along the blade, each of said teeth having a tip, a rake face adjacent to the tip, a curvilinear base surface located on an opposite side of the rake face relative to the tip, and at least one relief surface located on an opposite side of the tip relative to the rake face, the tip of each tooth and the tip of the next consecutively disposed tooth defining a pitch distance, and the curvilinear base surface and the tip of each tooth cooperating to define a maximum gullet depth, wherein the rake face and the curvilinear base surface of each tooth cooperate to define an effective gullet radius of at least about 30% of the pitch distance and greater than about 55% of the maximum gullet depth, and the rake face defines a length of between about 10% and about 25% of the maximum gullet depth.

2. The saw blade of claim 1 wherein the rake face of each tooth defines a positive rake angle.

3. The saw blade of claim 1 wherein the at least one relief surface of each tooth includes a primary relief surface located on an opposite side of the tip relative to the rake face, and a secondary relief surface located on an opposite side of the primary relief surface relative to the tip, the primary relief surface being defined by a first acute relief angle relative to a plane extending between the tips of consecutively disposed teeth, and the secondary relief surface being defined by a secondary relief angle relative to said plane greater than the first relief angle and between approximately 35° and approximately 55°.

4. The saw blade of claim 3 wherein the first relief angle is approximately 35°.

5. The saw blade of claim 3 wherein the second relief angle is approximately 45°.

6. The saw blade of claim 1 wherein the curvilinear base surface is defined by a combination of radial and rectilinear sections.

7. A saw blade as defined in claim 1, wherein the effective gullet radius is at least approximately 65% of the maximum gullet depth.

8. A saw blade as defined in claim 1, wherein the maximum gullet depth is greater than approximately 40% of the pitch distance.

9. A saw blade as defined in claim 1, wherein the curvilinear base surface is defined by at least one radius, an end portion of the curvilinear base surface defined by said radius adjoins an adjacent end portion of the rake face, and the adjacent end portion of the rake face is approximately tangential thereto.

10. A saw blade having a cutting edge defined by a plurality of teeth disposed along the blade, each of said teeth having a gullet area defined by a tip, a rake face extending adjacent to the tip, a curvilinear base surface located on an opposite side of the rake face relative to the tip, and at least one relief surface located on an opposite side of the tip relative to the rake face, each tooth and the next consecutively disposed tooth defining a pitch distance extending between the tips thereof, the curvilinear base surface and the tip of each tooth cooperating to define a gullet depth, and the rake face and the curvilinear base surface of each tooth cooperating to define an effective gullet radius, each of said teeth further comprising (i) first means for facilitating the discharge of chips from the gullet area during a cutting operation, said first means being defined by said effective gullet radius being at least approximately 30% of the pitch distance and greater than approximately 55% of the maximum gullet depth, and (ii) second means for enhancing the stress bearing capabilities of the tooth, said second means being defined by the rake face having a length of between approximately 10% and approximately 25% of the maximum gullet depth.

11. The saw blade of claim 10 wherein the rake face defines a positive rake angle as measured relative to a plane approximately perpendicular to a plane extending between the tips of consecutively disposed teeth.

12. The saw blade of claim 10 wherein the curvilinear base surface is defined by a first radius tangent to the rake face and a second radius tangent at one end to the first radius.

13. A saw blade as defined in claim 10, wherein the first means is further defined by a primary relief surface located on an opposite side of the tip relative to the rake face, and a secondary relief surface located on an opposite side of the primary relief surface relative to the tip, the primary relief surface defining a first acute relief angle relative to a plane extending between the tips of consecutively disposed teeth, and the secondary relief surface defining a second relief angle relative to said plane greater than the first relief angle and between approximately 35° and approximately 55°.

14. A saw blade as defined in claim 13, wherein the first means is further defined by said first relief angle being at least approximately 35°.

15. A saw blade as defined in claim 10, wherein the first means is defined by said effective gullet radius being between approximately 65% and approximately 85% of the maximum gullet depth.

16. A saw blade as defined in claim 10, wherein the second means is further defined by an end portion of the rake face adjacent to the curvilinear base surface being approximately tangential thereto.

17. A saw blade as defined in claim 10, wherein the first means is further defined by a primary relief surface located on an opposite side of the tip relative to the rake face, and a secondary relief surface located on an opposite side of the primary relief surface relative to the tip, the primary relief surface defining a first acute relief angle relative to a plane extending between the tips of consecutively disposed teeth, and the secondary relief surface being formed by a curvilinear surface defined by at least one radius.

* * * * *